United States Patent [19]

Thackeray et al.

[11] Patent Number: 5,153,081
[45] Date of Patent: Oct. 6, 1992

[54] LITHIUM MANGANESE OXIDE COMPOUND

[75] Inventors: Michael M. Thackeray; Margaretha H. Rossouw, both of Pretoria, South Africa

[73] Assignee: CSIR, South Africa

[21] Appl. No.: 558,816

[22] Filed: Jul. 27, 1990

[30] Foreign Application Priority Data

Jul. 28, 1989 [ZA] South Africa ............... 89/5789
Apr. 12, 1990 [ZA] South Africa ............... 90/2837

[51] Int. Cl.$^5$ ............... H01M 6/16; H01M 4/50; C01G 45/12
[52] U.S. Cl. ............... 429/194; 423/599; 423/641; 429/224
[58] Field of Search ............... 423/605, 599, 641; 429/224, 194

[56] References Cited

U.S. PATENT DOCUMENTS

| | | | |
|---|---|---|---|
| 2,562,705 | 7/1951 | Ellestad et al. | 423/599 |
| 4,246,253 | 1/1981 | Hunter | 423/605 |
| 4,277,360 | 7/1981 | Mellors et al. | 429/224 |
| 4,758,484 | 7/1988 | Furukawa et al. | 429/224 |
| 4,828,834 | 5/1989 | Nagaura et al. | 429/224 |
| 4,959,282 | 9/1990 | Dahn et al. | 423/605 |
| 4,980,251 | 12/1990 | Thackeray et al. | 429/224 |

FOREIGN PATENT DOCUMENTS

| | | |
|---|---|---|
| 009934 | 4/1980 | European Pat. Off. |
| 0265950 | 5/1988 | European Pat. Off. |
| 2221213A | 1/1990 | United Kingdom |

OTHER PUBLICATIONS

Goodenough, "Manganese Oxides as Battery Cathodes", in Proc. of the Symposium on Manganese Dioxide Electrode Theory and Practice for Electrochemical Applications Electrochemical Society, Battery Division, Proceedings, vol. 85-4 (1986), pp. 77-96.
Rossouw, M. H., et al. "Structural Aspects of Lithium-Manganese-Oxide Electrodes for Rechargeable Lithium Batteries", Materials Research Bulletin, vol. 25 (1990), pp. 173-182.
DeKock, A. et al. "Defect Spinels in the System Lithium Oxide . $\gamma$-Manganese Dioxide (y>2.5): A Neutron-Diffraction Study and Electrochemical Characterization of $Li_2Mn_4O_9$", Mat. Res. Bull, vol. 25, (1990), p. 657.
M. Jansen, "On the Knowledge of the Sodium Chloride-Type Structure Family: New Investigations on $Li_2MnO_3$", Zeitschrift fuer Anorg. Allgem. Chemie, vol. 397 (1973), pp. 279-289.
J. C. Hunter. "Preparation of a New Crystal Form of Manganese Dioxide: $\lambda-MnO_2$", Chemical Abstracts, vol. 95, #160312t (1981).
Rossouw, M., et al. "Lithium Manganese Oxides from $Li_2MnO_3$ for Rechargeable Lithium Battery Operations", *Mat. Res. Bull.*, vol. 26, pp. 463-473 (1991).
David et al., "The Crystal Structure of $Li_2MNO_2$", Revue de Chimie Minerale, 20, 1983, pp. 636-642.
Wells, A. F., *Structural Inorganic Chemistry*, the passage "The $\gamma$-MO.OH Structure" at pp. 527-528.
Nohma, T., et al. "Manganese Oxides for a Lithium Secondary Battery—Composite Dimensional Manganese Oxide (CDMO)", *Journal of Power Sources*, 26, 389-396 (1989).
Hunter, James C., "Preparation of a New Crystal Form of Manganese Dioxide: $\lambda-MnO_2$," *Journal of Solid State Chemistry*, 39, 142-147 (1981).

*Primary Examiner*—Michael Lewis
*Assistant Examiner*—Peter DiMauro
*Attorney, Agent, or Firm*—Richards, Medlock & Andrews

[57] ABSTRACT

The invention provides a novel lithium manganese oxide compound in which oxygen anions, lithium cations and manganese cations are arranged in layers, each layer of lithium cations being sandwiched between two layers of oxygen anions, each layer of manganese cations being sandwiched between two layers of oxygen anions and each layer of oxygen anions being sandwiched between a layer of lithium cations and a layer of manganese cations. The invention also provides a method of making the compound; and an electrochemical cell employing the compound as its cathode.

10 Claims, 7 Drawing Sheets

LITHIUM MANGANESE OXIDE COMPOUND

TECHNICAL FIELD OF THE INVENTION

The invention relates to a layered lithium manganese oxide compound and to a method of making such a compound. The invention further includes an electrochemical cell employing the compound as the cathode.

SUMMARY OF THE INVENTION

This invention relates to a lithium manganese oxide compound. More particularly it relates to such compound suitable for use as a cathode in an electrochemical cell. It also relates to a method of preparing such compound; and to an electrochemical cell having a cathode comprising such compound.

According to one aspect of the invention there is provided an essentially layered lithium manganese oxide compound in which the average valency of the manganese ("Mn") cations is from +3 to +4, the compound having its oxygen ("O") anions arranged in layers in a substantially cubic-close-packed arrangement, with the lithium ("Li") cations being arranged in layers and the Mn cations occupying octahedral sites and being arranged in layers. Each layer of Li cations is sandwiched between two layers of O anions, each layer of Mn cations is sandwiched between two layers of O anions and each layer of O anions is sandwiched between a layer of Li cations and a layer of Mn cations. Preferably, at least 75% of the Mn cations in the compound are located in the layers of Mn cations and the remainder of the Mn cations are located in the layers of Li cations.

In other words, in said compound, the layers of Li cations will accordingly alternate with the layers of Mn cations, but will be separated therefrom by a layer of O anions. While, as indicated above, the layers of Li cations may contain a minor proportion of the Mn cations of the compound, the layers of Mn cations in turn may contain a minor proportion of the Li cations of the compound. Preferably, at least 90% of the Mn cations in the compound are located in the layers of Mn cations.

As the average valency of the Mn cations may be less than +4, the lithium manganese oxide compound of the invention may be somewhat oxygen-deficient. However, the average valency of the Mn cations is preferably at least +3.5 and more preferably close to +4 or equal thereto.

Furthermore, particularly when the lithium manganese oxide compound of the invention is prepared by a method involving acid leaching as described hereunder, its layers of Li cations may, in addition to containing Li cations, contain a proportion of H cations, which can be regarded as being Li cations replaced by H cations by ion exchange. Depending on the degree of cation exchange, the relative proportions of Li and H cations in the structure can in principle vary from essentially 100% Li cations and substantially no H cations, to essentially 100% H cations and substantially no Li cations.

When the layered lithium manganese oxide compound is prepared, e.g., from $Li_2MnO_3$ as described hereunder, it can have the formula $A_{2-2x}MnO_{3-x}$ in which, neglecting any surface water or water occluded at grain boundaries, $0 < x \leq 1$, A being a cation selected from Li cations and a mixture of Li cations and H cations. As the invention extends to said compound $A_{2-2x}MnO_{3-x}$ when x is 1, it includes a layered $MnO_2$ compound in which each layer of Mn cations is sandwiched between two layers of O anions and each layer of O anions is sandwiched between a layer of Mn cations and a layer of O anions, so that a pair of layers of O anions is sandwiched between two layers of Mn cations, as described hereunder. In this case, the structure of the compound may be stabilized by the presence of small numbers of stabilizing cations other than Li cations, between adjacent layers of O anions. The stabilizing cations may be H or Zn cations.

According to another aspect of the invention, there is provided a method of preparing, as a product, a layered lithium manganese oxide compound as described above, which method comprises the steps of:

synthesizing a $Li_2MnO_3$ precursor as defined herein by reacting together, at a temperature of 350°–800° C., a manganese compound selected from the group consisting of manganese salts, manganese oxides, manganese hydroxides and mixtures thereof with a lithium compound selected from the group consisting of lithium salts, lithium oxide, lithium hydroxide and mixtures thereof, the reaction taking place by heating under a oxygen-containing oxidizing atmosphere with said compounds intimately mixed in finely divided solid form, the mixture having an average particle size of at most 250 μ and the ratio of the Li cations to Mn cations in the mixture being in the range 1.8:1–2.2:1; and leaching $Li_2O$ from the $Li_2MnO_3$ precursor by means of an aqueous mineral acid, to leave a product which comprises $MnO_2$ combined together with a residual amount of $Li_2O$, the product comprising at most 50% of the Li cations originally present in said precursor.

Preferably, the heating is for a time such that the reaction between the manganese compound and the lithium compound is substantially complete, i.e., to produce a substantially single-phase $Li_2MnO_3$ precursor. The reaction time required for this is inversely related to the reaction temperature and the reaction temperature and reaction time will typically be selected by routine experimentation, taking into account practical and economic considerations. At 350° C. the reaction time will be of the order of about 20 days and at 800° C. it will be of the order of about 1 day.

The $Li_2MnO_3$ precursor, whose formula may instead be written as $Li_2O.MnO_2$, has a structure in which the oxygen anions are cubic-close-packed, but which is slightly distorted compared with an ideal cubic-close-packed structure. The cations occupy all the octahedral sites of the structure, which are located in layers between cubic-close-packed oxygen planes. Alternate cation layers are filled respectively entirely with Li ions, and with Mn ions and Li ions in a 2:1 atomic ratio.

The $Li_2MnO_3$ precursor may be synthesized by reacting together the manganese compound and lithium compound at a temperature of 370°–450° C. under air, with the mixture having an average particle size of at most 100 μ and the Li cation:Mn cation ratio being 1.9:1–2.1:1, the leaching being by means of a concentrated mineral acid selected from nitric acid, hydrochloric acid and sulfuric acid to leave a product comprising 5–30% of the Li cations originally present in said precursor. Typically, the leaching is at room temperature (e.g., 15°–30° C.) and can be regarded as leaching out a $Li_2O$ component from the $Li_2MnO_3$ precursor structure, leaving a $MnO_2$ component of said structure, together with some residual $Li_2O$, the layered arrangement of the Mn cations in the precursor being essentially maintained. This can be expressed (when taken ideally to completion) by:

in which each layer of Mn cations is sandwiched between two layers of O anions and each layer of O anions is sandwiched between a layer of O anions and a layer of Mn cations, i.e., the O anion layers are arranged in pairs with each pair sandwiched between two layers of Mn cations, each Mn cation layer having a pair of layers of O anions on each side thereof.

In practice, the Applicant has found usually that, during the leaching, not all the lithium ions can easily be removed from the structure. However, the degree of removal of lithium ions can, within limits, be controlled by the degree of leaching which is allowed to take place, to ensure that a suitable residual small proportion (at most 50% as indicated above and typically 5-30%) of the lithium cations originally present in the precursor remain in the layered product to stabilize the layered structure provided by the $MnO_2$ in the product. Although, with sufficient leaching, it is, in principle, possible to leach substantially all the $Li_2O$ therefrom to leave the layered $MnO_2$ product described above. In this regard, it is also to be noted that, if the $Li_2MnO_3$ precursor is synthesized at higher temperatures, it is more difficult to leach out the $Li_2O$ component from the structure by means of a mineral acid, than when it is synthesized at lower temperatures. For the leaching, hydrochloric acid or sulfuric acid will typically be used, and they may be found at a Molarity of 10-15, e.g., about 14.

The product, after said leaching, can contain in addition to said H cations, some surface water and some occluded water associated with grain boundaries in its interior. For use in electrochemical cells, as described hereunder, which have lithium as an active anode material, the product should be anhydrous, as the presence of water is undesirable and because it can react with said lithium. The surface water and occluded water can be removed, at least partially, by drying, e.g., heating to 80° C. to remove surface water and heating up to 200° C. or more to remove said occluded water. Accordingly, the method may include the step, after the leaching, of drying the product by heating to remove surface water therefrom and to remove at least some occluded water from grain boundaries therein. The drying is preferably by heating under air to a temperature of at least 80° C. However, for use in aqueous cells in which zinc is the active anode material, as described hereunder, no heat treatment or drying of the product to remove water is necessary.

According to another aspect of the invention, there is provided an electrochemical cell having a cathode comprising a layered lithium manganese oxide compound as described above, a suitable anode which comprises, as its active anode substance, a metal selected from lithium and zinc, and a suitable electrolyte whereby the anode and cathode are electrochemically coupled together.

Such cells can accordingly be represented schematically (and ignoring any H cations in the layered lithium manganese oxide compound) by:

Li(anode)/electrolyte/layered lithium manganese oxide (cathode); or

Zn(anode)/electrolyte/layered lithium manganese oxide compound (cathode).

In such cells, when the active anode material is lithium, discharging such cells will involve insertion of Li cations into the cathode, with associated reduction of the Mn cations, from a theoretical maximum average valency of $+4$ when the cathode is $A_{2-2x}MnO_{3-x}$ as described herein, to a theoretical average minimum valency of $+3$. Although reduction of the Mn cations to an average valency of less than $+3$ is in principle possible, the electrochemical reaction when the average valency drops to below $+3$ will be associated with a drop in voltage from an open circuit value of approximately 3 V to below 2 V, which limits its usefulness. In practice, the average valency of the Mn cations will be controlled during charging and discharging to be between suitable values, e.g., a value of $+4$ in the nominally fully charged state and a value of $+3$ in the nominally fully discharged state.

While the cells of the invention, as indicated above, may be rechargeable storage cells, they may also, naturally, be primary cells. Rechargeable cells can in principle be loaded at any convenient average valency of the Mn cations between its said average values in the nominally fully discharged, nominally fully charged states, i.e., at any value between $+3$ and $+4$.

The cathode may comprise said lithium manganese oxide in particulate form compacted together with a suitable particular binder and a suitable electronically conductive particulate current collector to form a unitary artifact. More particularly, the binder may be polytetrafluoroethylene, the current collector being acetylene black, and said polytetrafluoroethylene and acetylene black being mixed with the lithium manganese oxide of the cathode in the usual proportions employed in the art, e.g., a mass ratio of polytetrafluoroethylene-:acetylene black ratio of 1:2 being used and the binder and particulate current collector together making up 20% by mass of the artifact, the compaction being by pressing on to a stainless steel current collector at a pressure of 5-15 MPa.

In one embodiment of the cell, the anode may be selected from lithium metal, lithium-containing alloys, lithium-containing compounds and mixtures thereof, the electrolyte being a room-temperature electrolyte comprising a salt having lithium as a cation thereof dissolved in an organic solvent. In this embodiment, the anode is preferably selected from lithium metal, lithium-/aluminum alloys, lithium/silicon alloys, lithium/carbon compounds and mixtures thereof, the electrolyte comprising a solution of a salt selected from $LiClO_4$, $LiAsF_6$, $LiBF_4$ and mixtures thereof, dissolved in an organic solvent selected from propylene carbonate, dimethoxyethane and mixtures thereof. In these cells, the ratio of lithium to other constituents of the anodes may be those typically employed in the art. In these cells, it is believed that the layered lithium manganese oxide cathode will act essentially as a two-dimensional cathode of the solid solution type or the intercalation compound type. In the cathode during discharge, Li ions from the anode pass through the electrolyte and diffuse into two-dimensional lithium ion layers or planes in the cathode via face-sharing octahedra and tetrahedra, the reverse taking place during charging. However, when the manganese layers contain lithium ions, then diffusion of lithium ions from one lithium layer to the next lithium layer is possible, resulting in three-dimensional diffusion pathways for the mobile lithium ions.

In another embodiment of the cell, the anode may be selected from metallic zinc and zinc alloys, the electrolyte being a room-temperature electrolyte comprising an aqueous solution. In these cells, the electrolyte may be a compound selected from $NH_4Cl$, $ZnCl_2$ and $KOH$. In these cells, as indicated above, the electrolytes may accordingly be of the type used in the art for Leclanche cells, $ZnCl_2$ cells or KOH cells. In these cells it is contemplated that, during discharge, cations from the electrolyte (e.g., H cations or Zn cations) will diffuse into the cathode structure, the reverse taking place during charging; and it is contemplated that said cations from the electrolyte will stabilize the layered structure of the cathode. Accordingly, the layered lithium manganese oxide of the cathode may, after cycling and in the charged state, contain, in addition to Li and H cations, a minor proportion of Zn cations which stabilize the charged cathode.

DETAILED DESCRIPTION OF THE INVENTION

The invention will now be described, by way of non-limiting illustrative example, with reference to tests which the Applicant has conducted, and with reference to the accompanying diagrammatic drawings.

EXAMPLE 1

A sample of lithium manganese oxide of formula $A_{2-2x}MnO_{3-x}$ in accordance with the present invention was made by reacting together LiOH and $\gamma$-$MnO_2$ in proportions such that the atomic ratio between the lithium in the LiOH and the manganese in the $\gamma$-$MnO_2$ was 2:1.

The LiOH and $\gamma$-$MnO_2$ were mixed with a mortar and pestle until substantially homogeneous to form a mixture which was a powder with an average particle size of less than 50 $\mu$. The reaction was effected by heating in air at 400° C. for 18 days to obtain a substantially single-phase $Li_2MnO_3$ precursor powder.

The precursor was leached with 14 Molar sulfuric acid at 25° C. for 48 hours to obtain an essentially layered product of formula $A_{2-2x}MnO_{3-x}$ in accordance with the present invention in which the atomic ratio of Li:Mn was 0.15:1.00.

Figure 1:
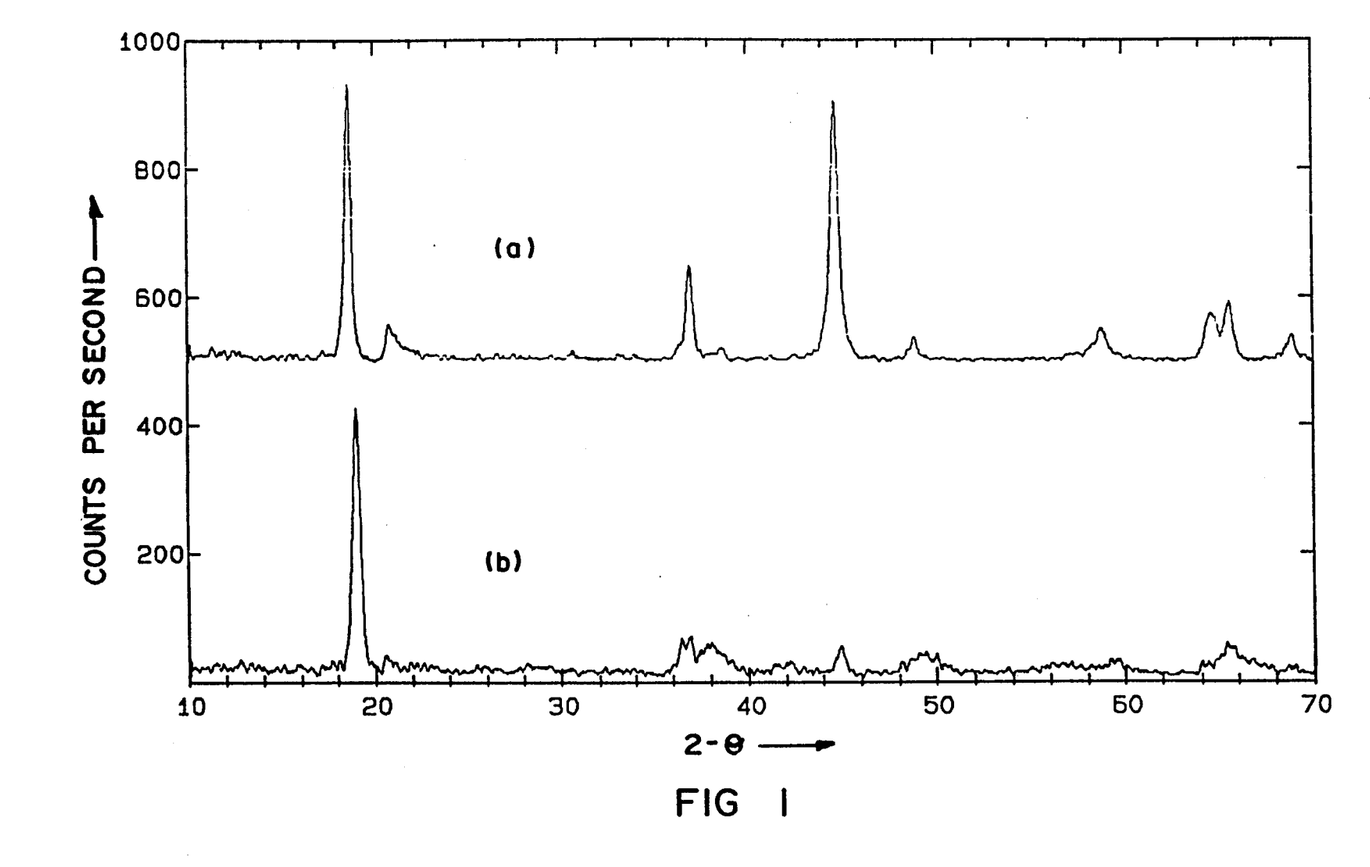
FIG. 1 shows a trace of an X-ray diffraction pattern of (a) a $Li_2MnO_3$ precursor when prepared by reacting $\gamma$-$MnO_2$ with LiOH at 400° C., and of (b) said $Li_2MnO_3$ after delithiation thereof by acid treatment to remove $Li_2O$ to obtain an $A_{2-2x}MnO_{3-x}$ product in accordance with the present invention, for the $2\theta$ range of 10°-70° using CuK$\alpha$ radiation.

The $Li_2MnO_3$ precursor and the $A_{2-2x}MnO_{3-x}$ product were subjected to X-ray diffraction using CuK$\alpha$ radiation and over the $2\theta$ range of 10°-70°. The diffraction pattern trace of the precursor is shown in FIG. 1 at (a), a similar trace for the $A_{2-2x}MnO_{3-x}$ product being shown at (b) in FIG. 1.

EXAMPLE 2

Figure 4:
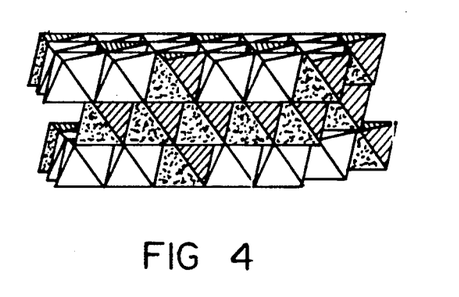
FIG. 4 shows a schematic representation of the structure of the $Li_2MnO_3$ precursor whose trace is shown in FIG. 2 at (a)

Example 1 was repeated in identical fashion, except that the heating in air was at 700° C. for 24 hours. X-ray diffraction traces for the $Li_2MnO_3$ precursor and the $A_{2-2x}MnO_{3-x}$ product are shown respectively at (a) and (b) in FIG. 2. A schematic representation of the $Li_2MnO_3$ precursor is shown in FIG. 4.

Figure 3:
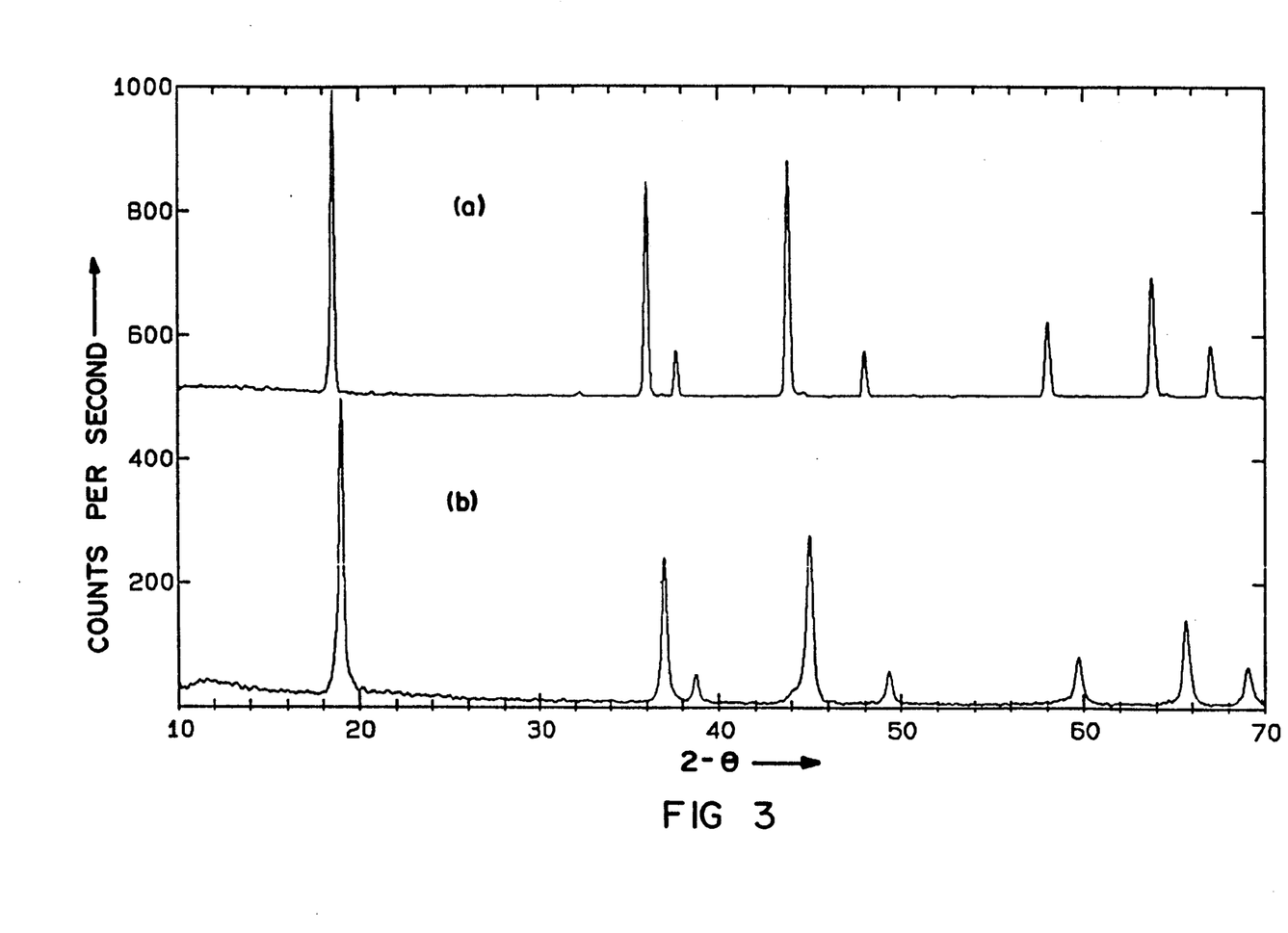
FIG. 3 shows a trace, similar to FIG. 1, of (a) a standard (control) $LiMn_2O_4$ reference sample and (b) of a standard (control) $\lambda$-$MnO_2$ reference sample.

By way of comparison, similar X-ray diffraction traces for a standard (control) $LiMn_2O_4$ reference sample and a standard (control) $\lambda$-$MnO_2$ reference sample are shown in FIG. 3 at (a) and (b), respectively. It is to be noted that the X-ray diffraction patterns for the $A_{2-2x}MnO_{3-x}$ product made at 400° C. [shown at (b) in FIG. 1] in accordance with the present invention is broadly similar to that of the reference samples of FIG. 3; and it is to be noted that the $LiMn_2O_4$ reference sample has a spinel structure, and that the $\lambda$-$MnO_2$ reference sample has a defect spinel structure, i.e., $\square_{1.0}[Mn_2]O_4$, obtained by delithiating $Li[Mn_2]O_4$ in 1 Molar sulfuric acid at 25° C. There are, however, significant differences between the pattern at (b) in FIG. 1 and the patterns at (a) and (b) in FIG. 3; and between these patterns ((b) in FIG. 1 and (a) and (b) in FIG. 3) on the one hand and the pattern of the $Li_2MnO_3$ precursor shown at (a) in FIG. 1 (which has a rock-salt structure) on the other hand.

Figure 2:
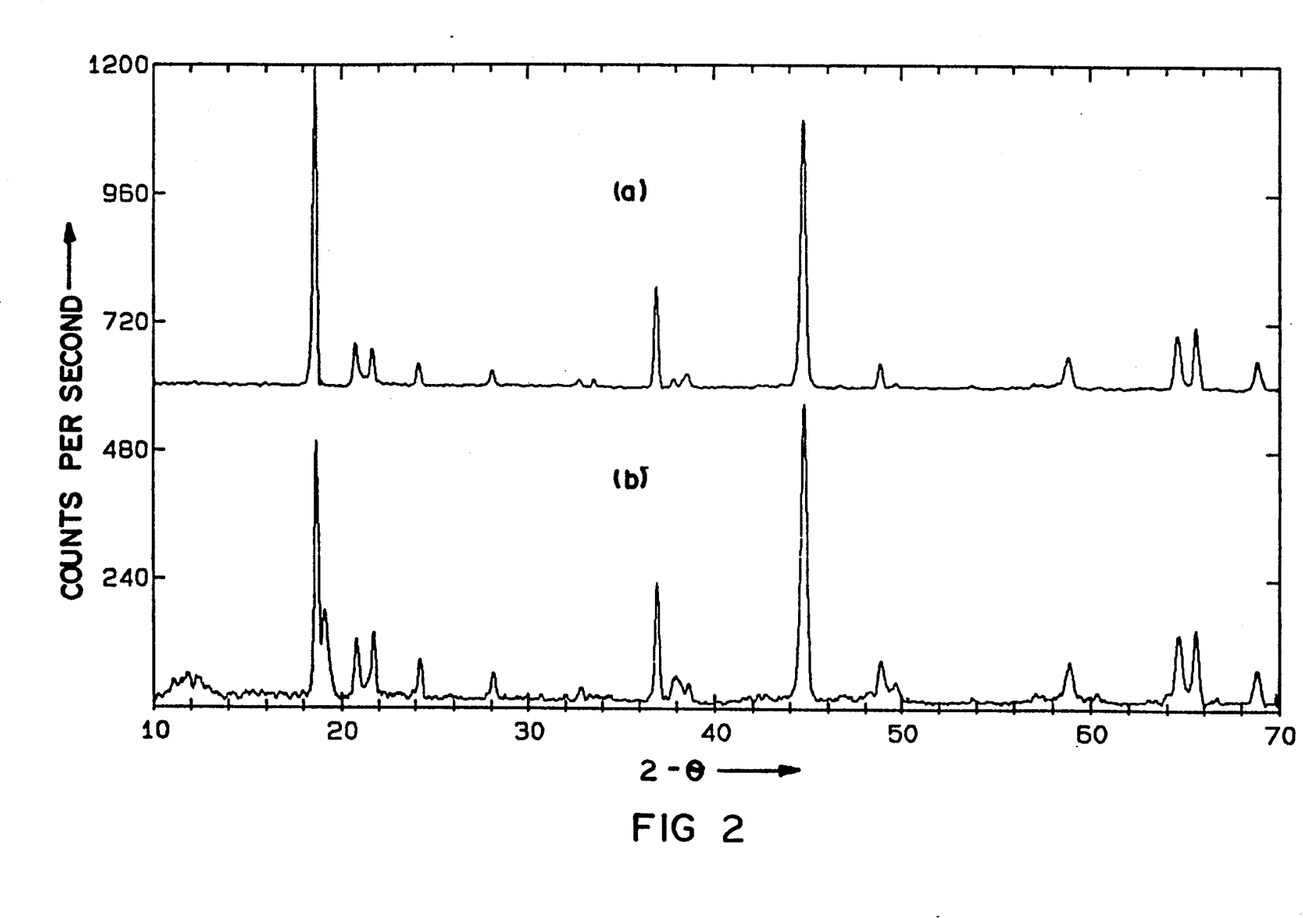
FIG. 2 shows similar traces to those of FIG. 1 of (a) $Li_2MnO_3$ when prepared in the same fashion from the same reagents but at 700° C. instead of 400° C., and of (b) this $Li_2MnO_3$ after delithiation in the same fashion to obtain an $A_{2-2x}MnO_{3-x}$ product according to the invention.

The pattern shown at (a) in FIG. 1 shows that the $Li_2MnO_3$ precursor made at 400° C. is significantly less crystalline than the $Li_2MnO_3$ precursor made at 700° C. [shown at (a) in FIG. 2], as reflected by the significantly broader peaks shown at (a) in FIG. 1, compared with those at (a) in FIG. 2.

The trace at (b) in FIG. 1 shows retention, in the $A_{2-2x}MnO_{3-x}$ product, of a strong, well resolved peak at about 19° $2\theta$, and this is indicative of the retention in this product of the layering of the cubic-close-packed oxygen anion array of the $Li_2MnO_3$ precursor whose trace is shown at (a) in FIG. 1. The significant shift towards the right of this peak in the trace for the product compared with the trace for the precursor (i.e., an increase in the $2\theta$ value at which it occurs) is also indicative of a contraction of the layers of the lattice, which is an expected consequence of the delithiation. The overall patterns remain sufficiently unchanged, despite a loss of crystallinity, which indicates that the layered structure from the $Li_2MnO_3$ precursor has remained substantially intact in the $A_{2-2x}MnO_{3-x}$ product, both when the precursor is made at 400° C. and when it is made at 700° C. However, changes in intensity of peaks from (a) to (b) in FIG. 1 (see e.g., the peaks at about 45° 2θ) indicate that some of the manganese cations may be displaced during the delithiation, probably into vacancies created by the removal of lithium cations from the lithium layers of the precursor during the delithiation.

In a spinel such as $LiMn_2O_4$, or in the defect spinel $\lambda\text{-}MnO_2$, the manganese cations occupy octahedral sites in alternate layers in a 3:1 ratio, and it is to be noted that the trace shown at (b) in FIG. 1 also resembles, but is not identical to, the traces of the $LiMn_2O_4$ and $\lambda\text{-}MnO_2$ spinel reference samples shown respectively in FIG. 3 at (a) and (b). Thus, a doublet peak at about 64°–66° 2θ in the trace at (a) in FIG. 1 of $Li_2MnO_3$ is reflected by a single peak in FIG. 3 at (a) and (b) respectively for $LiMn_2O_4$ and $\lambda\text{-}MnO_2$. At (b) in FIG. 1 the peak at about 66° 2θ is a broad singlet, which implies that the symmetry of the $A_{2-2x}MnO_{3-x}$ phase is closer to the cubic symmetry of $LiMn_2O_4$ or $\lambda\text{-}MnO_2$ (in which the separation of oxygen layers is identical from layer-to-layer, than to that of $Li_2MnO_3$, which is monoclinic symmetry, in which only alternate oxygen layers have the same interplanar d-spacings.

It is therefore believed that the $A_{2-2x}MnO_{3-x}$ product of the present invention has a layered structure intermediate that of an ideal layered structure in which the manganese cations are restricted to alternate cation layers, and that of $LiMn_2O_4$, so that more than 75% of the manganese cations of the product are present in the Mn layers, less than 25% of said Mn cations being present in the Li cation layers. Furthermore, it has been shown that when $Li_2O$ has been leached out of the structure such that the Li:Mn atomic ratio is 0.5, then heat treatment to 350° C. or more transforms the delithiated compound to a spinel structure, i.e., $LiMn_2O_4$, or an oxygen-rich spinel structure, i.e., $LiMn_2O_{4+\delta}$, in which $0 \leq \delta \leq 0.5$.

It is apparent from trace (b) in FIG. 2 that it is more difficult to leach out the $Li_2O$ component from the $Li_2MnO_3$ precursor of Example 2 than from that of Example 1, which precursor was made at a higher temperature than that of FIG. 1. However, the onset of $A_{2-2x}MnO_{3-x}$ formation by leaching is clearly apparent from the peaks at about 19° 2θ and at about 38° 2θ as indicated in trace (b) of FIG. 2.

The compound $A_{2-2x}MnO_{3-x}$, particularly as described above with reference to examples 1 and 2, has good electrochemical activity in primary and rechargeable cells of the type:

Li(anode)/electrolyte/$A_{2-2x}MnO_{3-x}$ (cathode)

as described hereunder.

Figure 5:
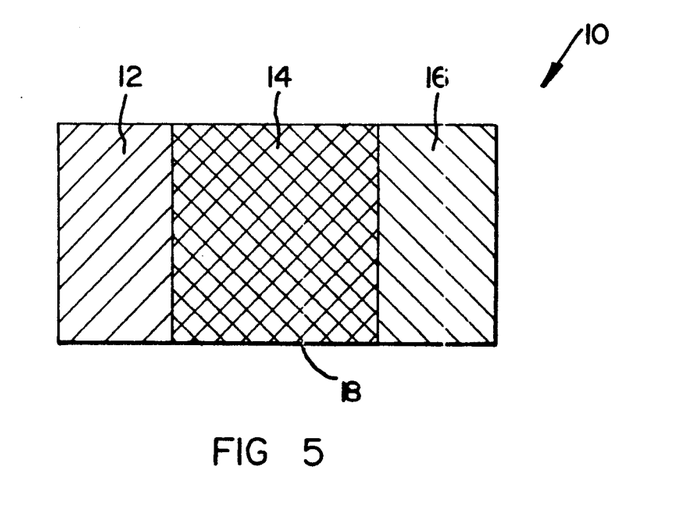
FIG. 5 shows a schematic representation of an electrochemical cell according to the present invention, employing the $A_{2-2x}MnO_{3-x}$ whose trace is shown in FIG. 1 at (b) as its cathode.

Turning to FIG. 5 of the drawings, a cell in accordance with the invention is shown schematically and is designated by reference numeral 10. The cell is of the type:

Lithium metal (anode)/electrolyte/$A_{2-2x}MnO_{3-x}$ (cathode)

the electrolyte being 1 Molar $LiClO_4$ in propylene carbonate.

The cell is designated 10 and the anode, electrolyte and cathode are respectively designated 12, 14 and 16, being contained in an insulating housing 18 with the anode separated from the cathode by the electrolyte and suitable terminals (not shown) being provided in electronic contact respectively with the anode and the cathode. In the cathode, the $A_{2-2x}MnO_{3-x}$ in powder form is mixed with polytetrafluoroethylene and acetylene black.

In the cathode, the polytetrafluoroethylene is a binder and the acetylene black is a current collector. The $A_{2-2x}MnO_{3-x}$ in powder form is mixed in a mass proportion of 80% $A_{2-2x}MnO_{3-x}$ with 20% by mass polytetrafluoroethylene and acetylene black, with the polytetrafluoroethylene and acetylene black being in a mass ratio of 1:2, and compacted at 5–10 MPa pressure, onto a stainless steel current collector.

the $A_{2-2x}MnO_{3-x}$ used was that produced by Example 1 above and heated in air at 80° C. for 48 hours to remove water and at least some of any water occluded at grain boundaries therein, prior to use.

Figure 6:
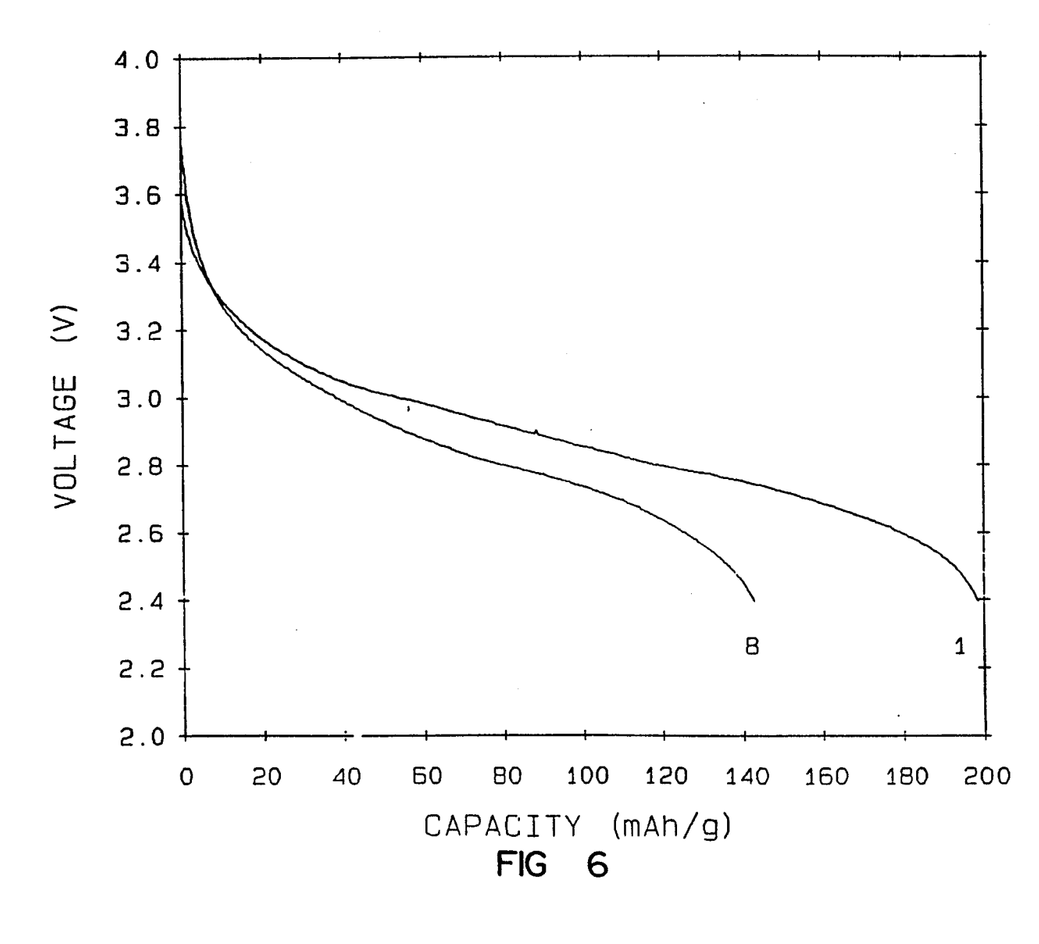
FIG. 6 shows electrochemical discharge curves for the 1st and 8th cycles, in terms of plots of cell voltage (V) against capacity (mAh/g), for the cell of FIG. 5.
Figure 7:
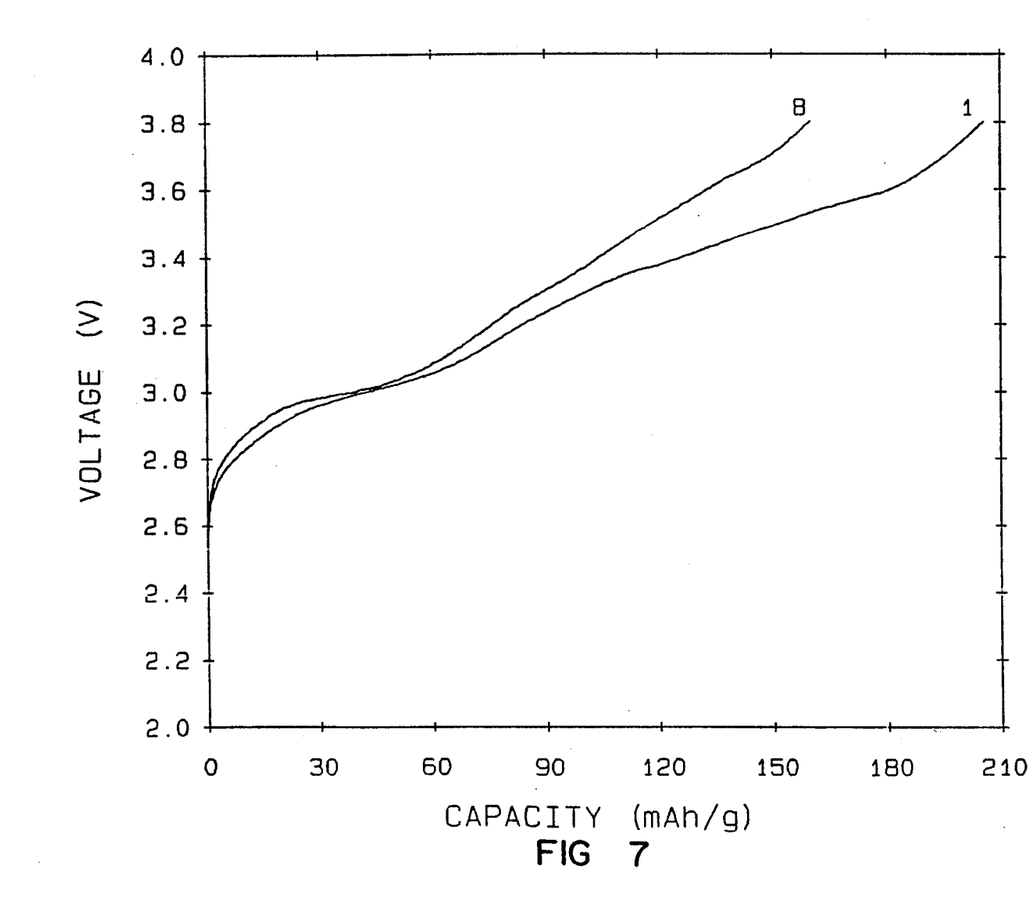
FIG. 7 shows curves, similar to these of FIG. 6, of the 1st and 8th charge curves of the cell of FIG. 5.

The cell 10 was subjected to a number of charge/discharge cycles, the initial cycle being a discharge cycle, and in FIGS. 6 and 7 are shown respectively the 1st and 8th discharge cycles, on the one hand, and the 1st and 8th charge cycles, on the other hand, with cell voltage (V) being plotted against cell capacity (mAh/g).

Figure 8:
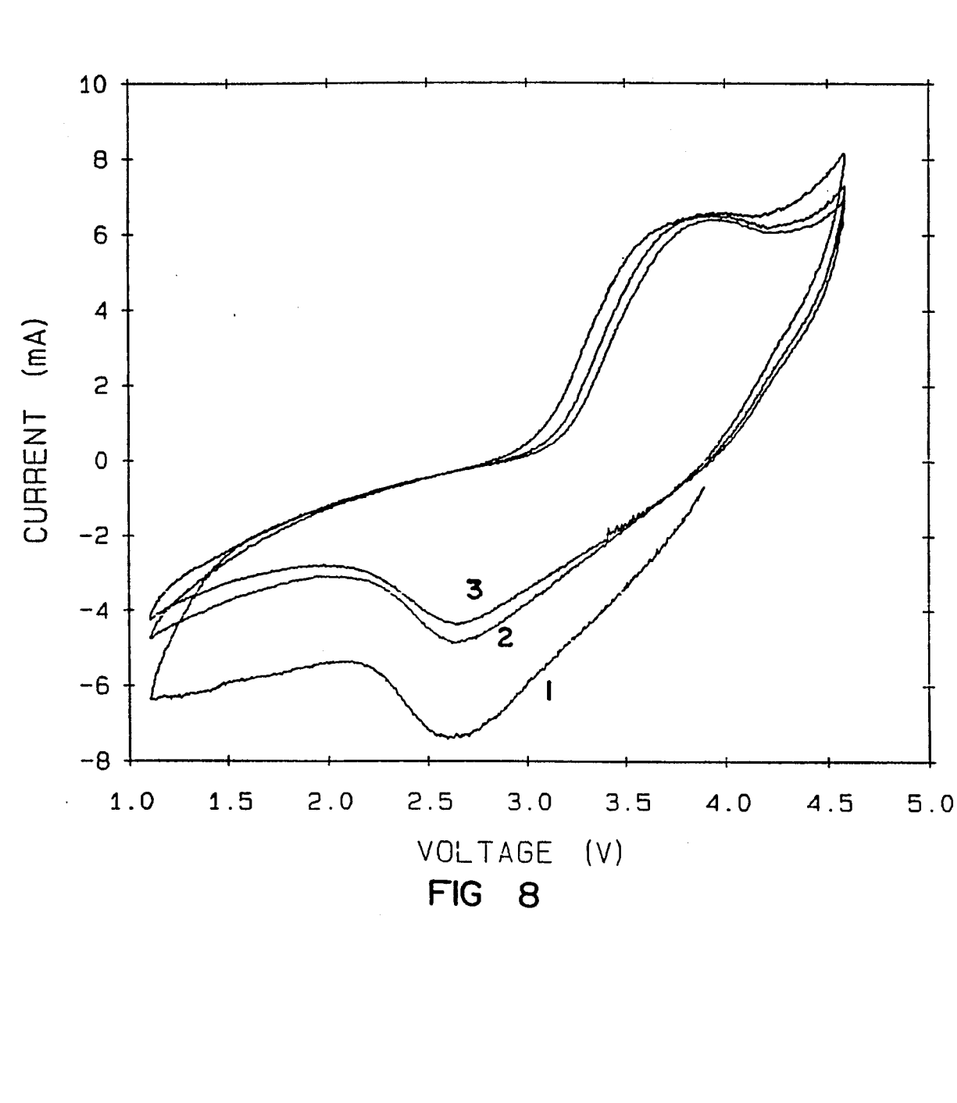
FIG. 8 shows a cyclic voltammogram trace of the cell of FIG. 5, for the first three cell cycles, when the cell is cycled at a scan rate of 1 mV/s between the voltage limits of 4.6 V and 1.1 V, in terms of plots of current (mA) against voltage (V).

Cyclic voltammetry tests were carried out on a similar cell and FIG. 8 shows a voltammogram in which current (mA) is plotted against voltage (V), between voltage limits of 4.6 V and 1.1 V for the first three cell cycles. The scan rate was 1 mV/s. From this voltammogram it can be seen that lithium can be inserted into and extracted from the product $A_{2-2x}MnO_{3-x}$ in question, at voltages which correspond to typical reduction of $Mn^{4+}$ and oxidation $Mn^{3+}$. It thus follows that the $A_{2-2x}MnO_{3-x}$ product contains Mn with an average valency between 3+ and 4+, i.e., a mixed 3+/4+ valency during charging and discharging.

The cell 10, during its first 8 charge/discharge cycles was discharged at a rate of 200 μA/cm² and charged at a rate of 100 μA/cm², between voltage limits of 2.40 V and 3.80 V at room temperature. The cathode comprised 40 mg of active cathode material ($A_{2-2x}MnO_{3-x}$), mixed with said 20% by mass of polytetrafluoroethylene and acetylene (carbon) black in a mass ratio of 1:2 of polytetrafluoroethylene:acetylene black.

Results are set forth in the following Table:

TABLE

| Discharge Capacity Data Capacity (mAh/g) | Cycle No. | Charge Capacity Data Capacity (mAh/g) |
| --- | --- | --- |
| 199 | 1 | 206 |
| 174 | 2 | 191 |
| 163 | 3 | 182 |
| 158 | 4 | 173 |
| 150 | 5 | 169 |
| 148 | 6 | 179 |
| 143 | 7 | 163 |
| 143 | 8 | 161 |

As indicated above it is believed that the $A_{2-2x}MnO_{3-x}$ product has an essentially layered structure and that lithium can be cycled in and out of the lithium layers over an extended range of lithium concentrations. The possibility of a minor amount of lithium in the manganese layers and a minor amount of manganese in the lithium layers, as mentioned above, should not be discounted. It is believed that any unextracted lithium that remains in the structure at the end of a practically useful charge cycle serves beneficially to stabilize the delithiated layered structure.

By analogy with $\gamma\text{-}MnO_2$ cathodes, such as electrolytically prepared $\gamma\text{-}MnO_2$ (EMD) (which $\gamma\text{-}MnO_2$ has one-dimensional tunnels for cation diffusion there-through as opposed to the two-dimensional layers in the layered lithium manganese oxide cathodes of the present invention) that have been used in lithium/$\gamma$-MnO$_2$ cells and zinc/$\gamma$-MnO$_2$ cells (the $\gamma$-MnO$_2$ in lithium cells being heated prior to use to remove surface water and at least some occluded water), it is believed that the layered lithium manganese oxide cathodes of the present invention will have application as cathode materials in both primary and secondary analogous cells having lithium or zinc as active anode material.

We claim:

1. A compound consisting essentially of lithium manganese oxide having the formula $$A_{2-2x}MnO_{3-x}$$

in which, neglecting any surface water or occluded water at grain boundaries, A is selected from the group consisting of Li cations and mixtures of Li cations and H cations, each x is defined by the relationship $0<x<1$, and the average valency of the Mn cations is in the range of $+3$ to $+4$, said lithium manganese oxide having a layered structure consisting essentially of oxygen anions arranged in layers in a substantially cubic-closed-packed arrangement, Li cations arranged in layers, and Mn cations occupying octahedral sites and arranged in layers, wherein each layer of Li cations is sandwiched between two layers of oxygen anions, each layer of Mn cations is sandwiched between two layers of oxygen anions, each layer of oxygen anions is sandwiched between a layer of Li cations and a layer of Mn cations, and more than 75% of the Mn cations in the lithium manganese oxide being located in the layers of Mn cations with the remainder of the Mn cations being located in the layers of Li cations.

2. A compound in accordance with claim 1 in which at least 90% of the Mn cations in the lithium manganese oxide are located in the layers of Mn cations.

3. A compound in accordance with claim 1 in which the average valency of the Mn cations is at least about $+3.5$.

4. An electrochemical cell having a cathode wherein the active cathode material consists of a layered lithium manganese oxide compound in accordance with claim 1, a suitable anode which comprises, as its active anode substance, a metal selected from lithium and zinc, and a suitable electrolyte whereby the anode and cathode are electrochemically coupled together.

5. The cell of claim 4 in which the cathode comprises said lithium manganese oxide in particular form, compacted together with a suitable particular binder and a suitable electronically conductive particulate current collector to form a unitary artifact.

6. The cell of claim 5 in which the binder is polytetrafluoroethylene, the current collector is acetylene black, and the compaction is performed by pressing at a pressure of 5-15 MPa.

7. The cell of claim 4 in which the anode is selected from the group consisting of lithium metal, lithium-containing alloys, lithium-containing compounds and mixtures thereof, the electrolyte being a room-temperature electrolyte comprising a salt having lithium as a cation thereof dissolved in an organic solvent.

8. The cell of claim 4 in which the anode is a lithium metal, a lithium/aluminum alloy, a lithium/silicon alloy, a lithium/carbon compound or a mixture thereof, the electrolyte is a solution of salt selected from the group consisting of LiClO$_4$, LiAsF$_6$, LiBF$_4$ and mixtures thereof, dissolved in an organic solvent selected from propylene carbonate, dimethoxyethane and mixtures thereof.

9. The cell of claim 4 in which the anode is a metallic zinc or zinc alloy, and the electrolyte is a room temperature electrolyte that is an aqueous solution.

10. The cell of claim 9, in which the solute of the electrolyte is a compound selected from the group consisting of NH$_4$Cl, ZnCl$_2$ and KOH.

* * * * *